(12) United States Patent
Fan et al.

(10) Patent No.: US 7,626,830 B2
(45) Date of Patent: Dec. 1, 2009

(54) BRACKET ASSEMBLY FOR EXPANSION CARDS

(75) Inventors: Chen-Lu Fan, Tu-Cheng (TW); Li-Ping Chen, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 575 days.

(21) Appl. No.: 11/309,925

(22) Filed: Oct. 27, 2006

(65) Prior Publication Data

US 2008/0100994 A1 May 1, 2008

(51) Int. Cl.
*H05K 7/14* (2006.01)
(52) U.S. Cl. .................. 361/801; 361/796; 361/807; 361/752
(58) Field of Classification Search .......... 361/796, 361/752, 801, 807, 679.01, 679.02, 679.4, 361/679.41
See application file for complete search history.

(56) References Cited

U.S. PATENT DOCUMENTS

| | | | |
|---|---|---|---|
| 5,338,214 A * | 8/1994 | Steffes et al. ............. 439/160 |
| 5,513,329 A * | 4/1996 | Pecone .................... 710/301 |
| 5,544,006 A * | 8/1996 | Radloff et al. ......... 361/679.32 |
| 5,604,871 A * | 2/1997 | Pecone .................... 710/301 |
| 5,831,821 A * | 11/1998 | Scholder et al. ........ 361/679.32 |
| 6,118,667 A * | 9/2000 | Grosser et al. .............. 361/752 |
| 6,118,668 A * | 9/2000 | Scholder et al. ............. 361/753 |
| 6,772,246 B2 * | 8/2004 | Kim et al. .................... 710/62 |
| 6,958,916 B2 * | 10/2005 | Roesner et al. ............ 361/790 |
| 6,985,360 B2 * | 1/2006 | Chen et al. ................. 361/704 |
| 7,123,470 B2 * | 10/2006 | Hsu et al. .............. 361/679.02 |
| 7,359,216 B2 * | 4/2008 | Hall .......................... 361/796 |
| 7,375,980 B2 * | 5/2008 | Peng et al. ................. 361/801 |

* cited by examiner

*Primary Examiner*—Dameon E Levi
(74) *Attorney, Agent, or Firm*—Wei Te Chung

(57) ABSTRACT

A bracket assembly includes a first expansion card (30), a second expansion card (26), a riser card (20) for horizontally receiving the second expansion card, and a retaining bracket (10) configured for securing to a computer chassis which provides connectors for the first expansion card and the riser card. The first expansion card has a first slot cover (31) at a front side thereof. The second expansion card has a second slot cover (21) at a front side thereof. The retaining bracket has a rectangular receiving wall (11). A bottom wall (14) and at least one side wall (12) extend perpendicularly from a periphery of the receiving wall. The receiving wall defines a first slot (111) and a second slot (112). The first slot and the second slot respectively receive the first slot cover and the second slot cover.

20 Claims, 4 Drawing Sheets

BRACKET ASSEMBLY FOR EXPANSION CARDS

1. FIELD OF THE INVENTION

The present invention relates to a bracket assembly for expansion cards, more particularly to a bracket assembly for mounting at least two different sizes of expansion cards in a computer or server.

2. DESCRIPTION OF RELATED ART

Presently, computer enclosures are becoming smaller and thinner. At the same time, it is desirable to provide more expansion ports or slots in a computer for attaching additional printed circuit cards (expansion cards) to add to or enhance functionality of the computer system. Usually a side panel or a rear panel of the computer enclosure defines a plurality of slots for receiving and mounting these additional printed circuit cards. Some expansion cards are large. Some new types of computer enclosures or server enclosures with bracket assembly have limited space and cannot accommodate a large expansion card directly mounted on a motherboard. One approach to addressing this drawback is to attach an intermediate riser card device in a single slot of the motherboard and attach a plurality of expansion cards to the riser card device for mounting the additional with another way.

Generally, the average size printed circuit cards are vertically attached to the motherboard directly, and the riser card device accommodates large expansion cards horizontally. So the average expansion cards and the riser card for the large expansion cards are all needed in the computer enclosure.

What is needed, therefore, is a bracket assembly for mounting at least two different sizes of expansion cards to a computer or server enclosure.

SUMMARY OF THE INVENTION

A bracket assembly includes a first expansion card, a second expansion card, a riser card for horizontally receiving the second expansion card, and a retaining bracket configured for securing to a computer chassis which provides connectors for the first expansion card and the riser card. The first expansion card has a first slot cover at a front side thereof. The second expansion card has a second slot cover at a front side thereof. The retaining bracket has a rectangular receiving wall. A bottom wall and at least one side wall extend perpendicularly from a periphery of the receiving wall. The receiving wall defines a first slot and a second slot. The first slot and the second slot respectively receive the first slot cover and the second slot cover. The riser card is attached to the retaining bracket with the first expansion card vertically attached at one side thereof, and the second expansion card horizontally attached at the other side thereof.

Other advantages and novel features will be drawn from the following detailed description of a preferred embodiment with attached drawings, in which:

DETAILED DESCRIPTION OF THE INVENTION

Figure 1:
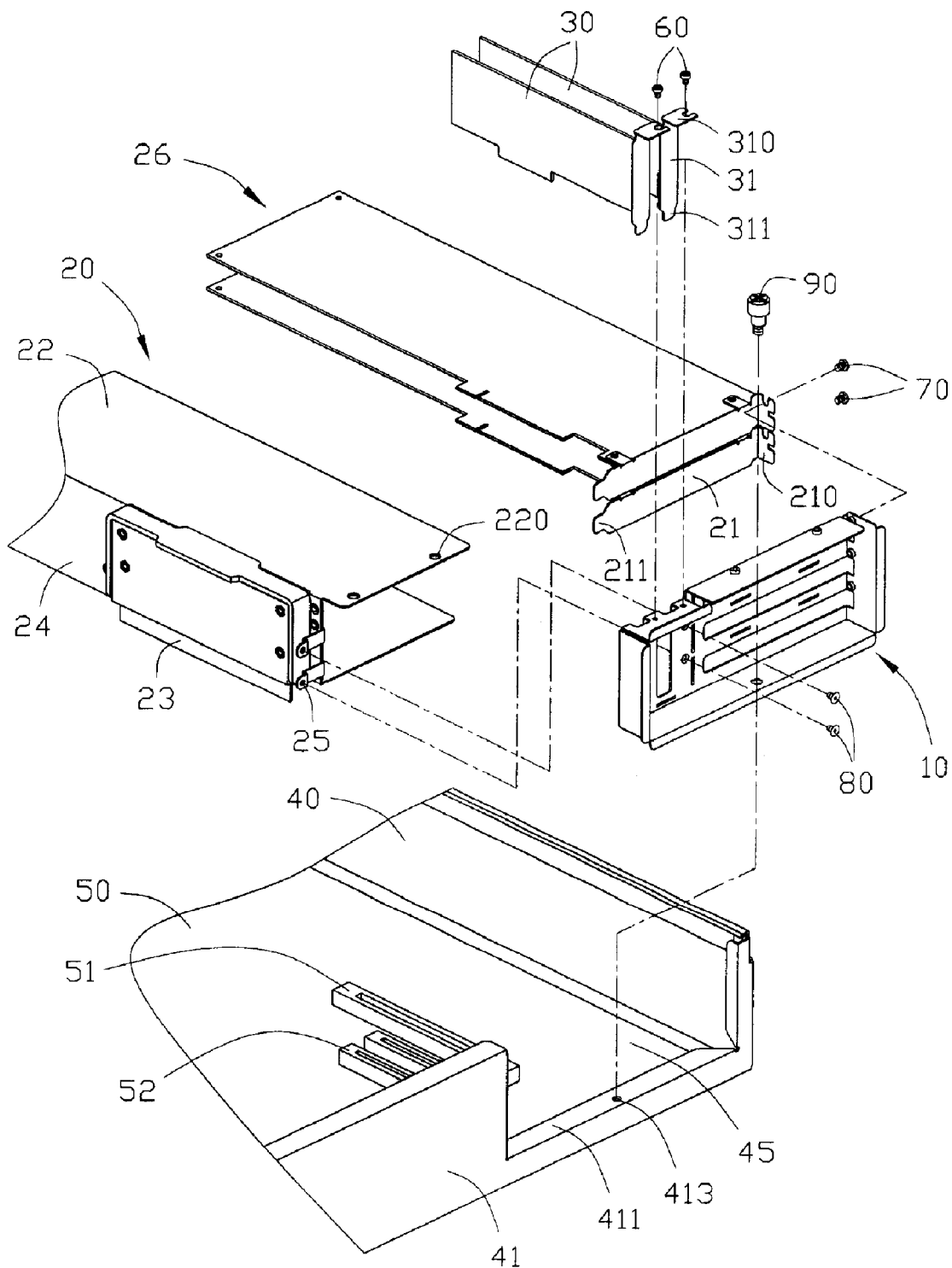
FIG. 1 is a partial, exploded, isometric view of a bracket assembly for expansion cards of a preferred embodiment of the present invention, the assembly including a chassis, a retaining bracket, a riser card, and a plurality of first expansion cards and second expansion cards.

Referring to FIG. 1, the bracket assembly includes a chassis 40, a retaining bracket 10, a riser card 20, and a plurality of first expansion cards 30 and a plurality of second expansion cards 26. Within this application the term "bracket assembly" can be used to refer to electronic assemblies, electronic devices and other multi-component systems in which the present invention can be used.

The chassis 40 includes a rear plate 41. An access 45 is defined in the rear plate 41 that enables access to components within the chassis 40. A bottom flange 411 perpendicularly extends into the chassis 40. A locking hole 413 is defined in the bottom flange 411. A motherboard 50 is disposed within the chassis 40. The motherboard 50 has a connector 51 and a plurality of connectors 52. The plurality of first expansion cards 30 each with a slot cover 31 at a front side is designed to insert into the connectors 52 of the motherboard 50. Each slot cover 31 has a bent clip 310 and an end portion 311.

The riser card 20 provides electrical connection between the second expansion cards 26 and the motherboard 50. The riser card 20 has a U-shaped sectional configuration, and includes a top panel 22, a side panel 24, and a bottom panel. A plurality of connectors is included on the side panel 24 for receiving the second expansion cards 26 from a horizontal direction. A pair of locking holes 220 is defined in a side edge of the top panel 22. A pair of tabs is bent from a side edge of the side panel 24. Each tab defines a locking hole 25. An insert portion 23 extends from a bottom edge of the side panel 24 corresponding to the connector 51 of the motherboard 50. Each second expansion card 26 has a second slot cover 21 at a side thereon. Each second slot cover 21 has a bent clip 210 at one distal end and a retaining portion 211 at the opposite distal end thereof.

Figure 2:
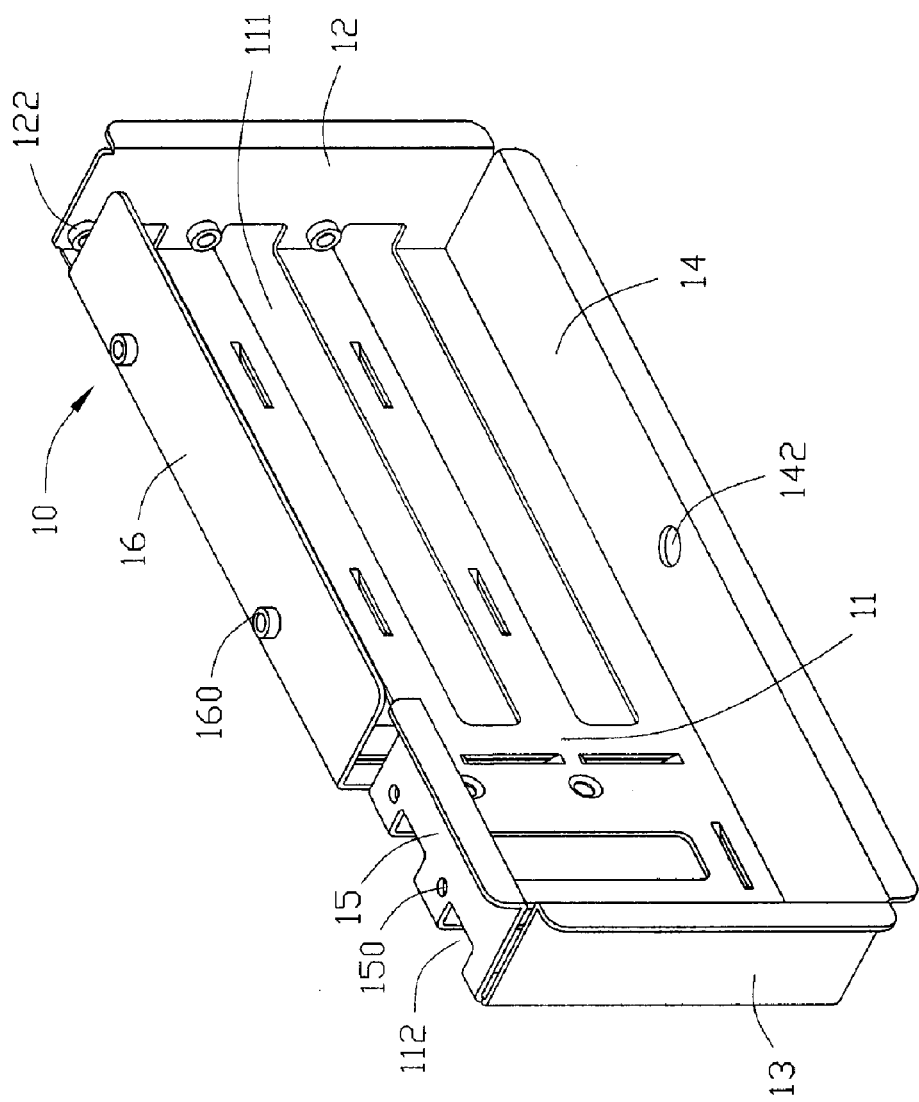
FIG. 2 is an enlarged view of the retaining bracket of FIG. 1.
Figure 3:
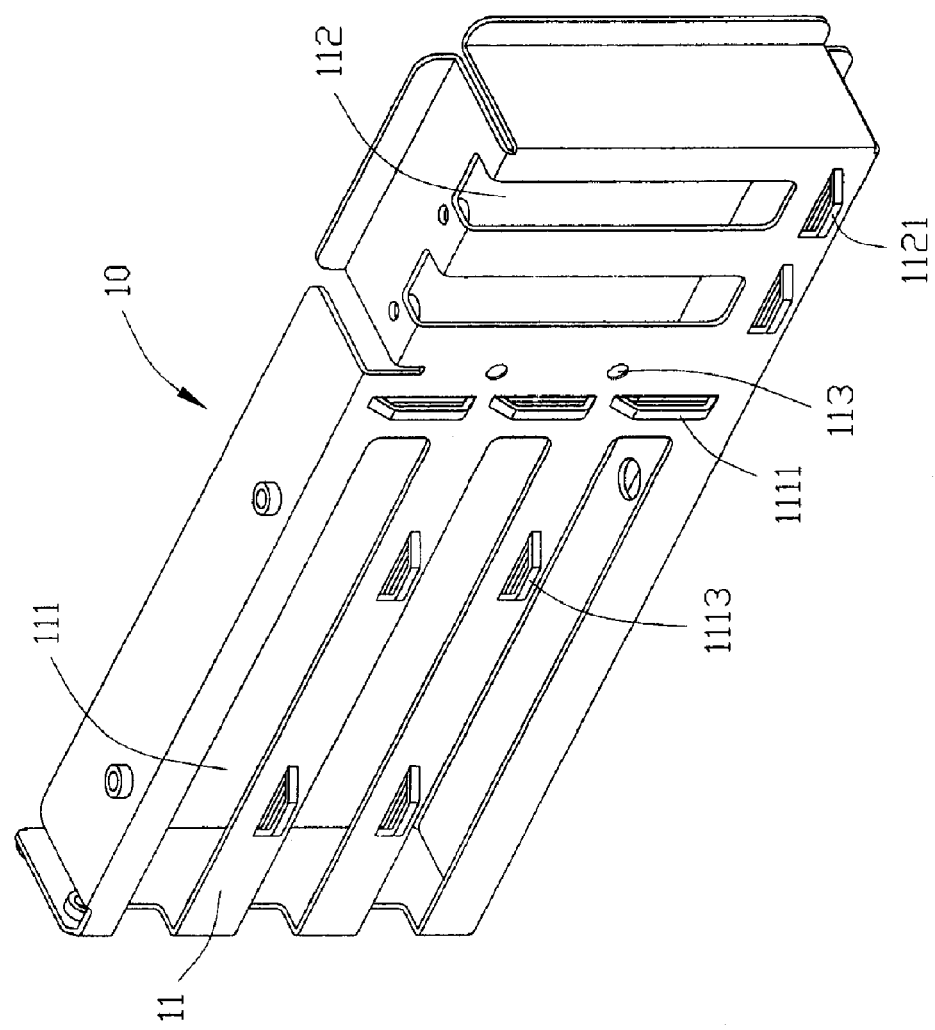
FIG. 3 is similar to FIG. 2, but shown from another aspect.

Referring also to FIG. 2 and FIG. 3, the retaining bracket 10 includes a rectangular receiving wall 11, a pair of side walls 12, 13, a bottom wall 14, a first top wall 16, and a second top wall 15. The second top wall 15, side walls 12, 13, and the bottom wall 14 are perpendicularly bent from each edge of the receiving wall 11, and each has an outer flange extending out. A plurality of first slots 111 and second slots 112 are defined in the receiving wall 11 to receive the first and second expansion cards 30, 26 and allow external devices, such as internet lines, to be connected to a net expansion card. The first slots 111 are parallel to the bottom wall 14, and spaced evenly apart from each other. One end of each first slot 111 extends to the side wall 12. The second slots 112 are parallel to the side wall 13, and spaced evenly apart from each other. A top end of each second slot 112 extends to the second top wall 15. A pair of locking posts 160 each with a through hole therein protrudes from the first top wall 16 corresponding to the locking holes 220 of the riser card 20. A pair of locking holes 150 is defined in the second top wall 15. A U-shaped retaining bridge 1111 is vertically formed on the receiving wall 11 aligned with each slot 111. A pair of guiding bridges 1113 is horizontally formed between every two first slots 111 on the receiving wall 11. A U-shaped retaining bridge 1121 is horizontally formed on the receiving wall 11 under each second slot 112. A pair of locking holes 113 is defined in a middle portion between the first slots 111 and the second slots 112 of the receiving wall 11 corresponding to the locking holes 25 of the riser card 20. A locking post 122 is formed between every two first slots 111 on the side wall 12. A locking hole 142 is defined in a middle portion of the bottom wall 142.

Figure 4:
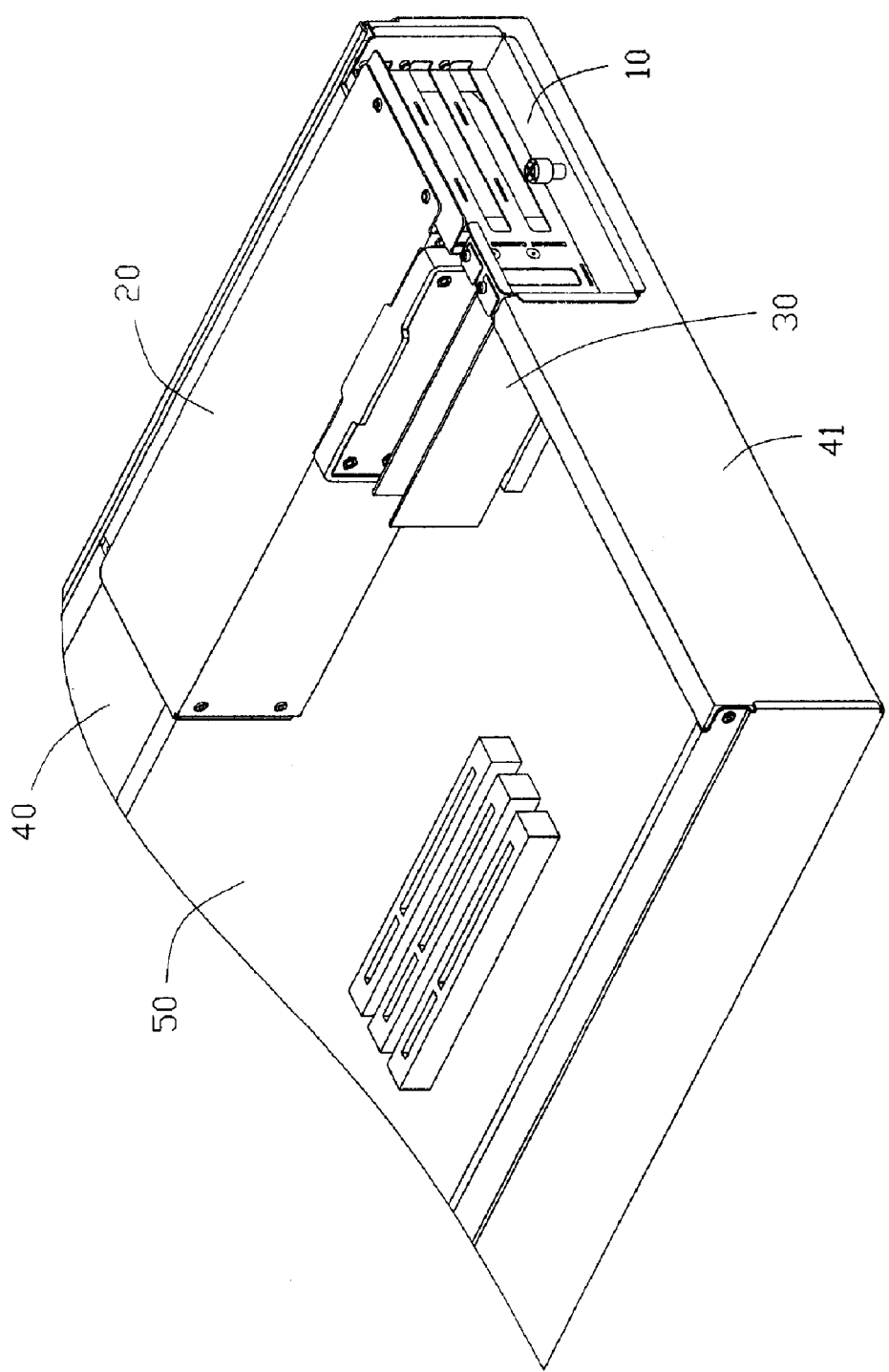
FIG. 4 is an assembled view of FIG. 1.

Referring also to FIG. 4, when assembling the bracket assembly, the riser card 20 is fastened to the retaining bracket 10 with locking posts 160 respectively engaging to the locking holes 220 of the riser card 20. An attachment, such as a screw 80 is provided to fasten the riser card 20 to the retaining bracket 10 through each locking hole 113 of the retaining bracket 10 to the locking hole 25 of the riser card 20. The second expansion cards 26 are respectively inserted into the riser card 20 from an outer side thereof with the retaining portion 211 of each second slot cover 21 inserted through the corresponding retaining bridge 1111. The bent clip 210 of each second slot cover 21 is fixed to the retaining bracket 10 by a screw 70 engaging with a corresponding locking post 122. Thus, the second expansion cards 26 are assembled to the retaining bracket 10 and inserted into the riser card 20. Then, having the insert portion 23 of the riser card 20 and the retaining bracket 10 respectively received in the connector 52 of the motherboard 50 and the access 45 of the chassis 40, the outer flanges of the retaining bracket 10 are blocked by the rear plate 41 of the chassis 40 for restraining the retaining bracket 10 from moving into the chassis 40. A fastener 90 is provided for mounting the retaining bracket 10 to the rear plate 41 of the chassis 40 through the locking holes 142 and 413. Thereby, the retaining bracket 10, riser card 20, and the second expansion cards 26 are mounted to the chassis 40. The first expansion cards 30 are respectively inserted into the corresponding connectors 52 of the motherboard 50 with end portion 311 of each first slot cover 31 inserted through the corresponding retaining bridge 1121 of the retaining bracket 10. Each bent clip 310 is secured to the retaining bracket 10 by a screw 60.

Alternatively, the retaining bracket 10 may be integrally formed with the chassis 40.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bracket assembly, comprising:
   a first expansion card having a first slot cover at a front side thereof;
   a second expansion card having a second slot cover at a front side thereof;
   a riser card for horizontally receiving the second expansion card; and
   a retaining bracket having a rectangular receiving wall, a bottom wall and at least one side wall extending perpendicularly from a periphery of the receiving wall, the receiving wall defining a first slot and a second slot, perpendicular to the first slot, the first slot and the second slot respectively receiving the first slot cover and the second slot cover, wherein the riser card is attached to the retaining bracket with the first expansion card vertically attached at one side thereof, and the second expansion card horizontally attached at the other side thereof.

2. The bracket assembly as described in claim 1, wherein the retaining bracket further comprises a top wall, and the top wall extends perpendicularly from a top edge of the receiving wall.

3. The bracket assembly as described in claim 2, wherein at least one locking post protrudes from the top wall, and at least one locking hole is defined in the riser card corresponding to the at least one locking post.

4. The bracket assembly as described in claim 1, wherein at least one locking hole is defined in a middle of the receiving wall, and the riser card defines at least one locking hole corresponding to the at least one locking hole of the retaining bracket.

5. The bracket assembly as described in claim 1 further comprising a chassis, the chassis having a plate, the plate defining a U-shaped access for receiving the retaining bracket, each of the bottom wall and the side wall of the retaining bracket having an outer flange extending out therefrom for abutting the exterior surface of the plate.

6. The bracket assembly as described in claim 5, wherein a bottom flange is bent in from an edge of the plate under the access for abutting against the retaining bracket.

7. The bracket assembly as described in claim 6, wherein the retaining bracket can be mounted in the access by fastening the bottom wall of the bracket to the bottom flange of the chassis.

8. The bracket assembly as described in claim 5, wherein a motherboard is positioned in the chassis for receiving the first expansion card and the riser card.

9. The bracket assembly as described in claim 1, wherein each of the first slot cover and the second slot cover has a bent clip for retaining the first expansion card and the second expansion card to the retaining bracket.

10. An electronic assembly comprising:
    an enclosure comprising a plate, the plate defining an access;
    a motherboard positioned in the enclosure; and
    a bracket assembly coupled to the motherboard and the access, wherein the bracket assembly comprising:
    a first expansion card having a first slot cover at a front side thereof, wherein the first expansion card is directly and perpendicularly coupled to the motherboard;
    a second expansion card having a second slot cover at a front side thereof;
    a riser card providing electrical connection between the second expansion card and the motherboard, wherein the riser card is directly coupled to the motherboard; and
    a retaining bracket defining a first slot and a second slot perpendicular to each other for respectively receiving the first slot cover and the second slot cover, wherein the retaining bracket occupies the access of the enclosure and the second expansion card is parallel to the motherboard.

11. The electronic assembly as described in claim 10, wherein the retaining bracket comprises a rectangular receiving wall parallel to the plate, and a bottom wall and at least one side wall respectively perpendicularly extends from a periphery of the receiving wall.

12. The electronic assembly as described in claim 11, wherein each of the side walls and the bottom wall has an outer flange abutting an exterior surface of the enclosure for restricting the retaining bracket from moving in the enclosure.

13. The electronic assembly as described in claim 11, wherein the retaining bracket further comprises a top wall extending perpendicularly therefrom, at least one locking post protrudes from the top wall, at least one locking hole is defined in the riser card corresponding to the at least one locking post.

14. The electronic assembly as described in claim 10, wherein at least one locking hole is defined between the first slot and the second slot in the receiving wall, and the riser card defines at least one locking hole corresponding to the at least one locking hole of the retaining bracket.

15. The electronic assembly as described in claim 10, wherein a bottom flange is bent in from an edge of the plate under the access for abutting against the retaining bracket.

16. The electronic assembly as described in claim 15, wherein the retaining bracket can be mounted in the access by fastening the bottom wall of the bracket to the bottom flange of the plate.

17. A bracket assembly comprising:
   an enclosure providing two slots perpendicular to each other;
   a motherboard positioned within the enclosure and perpendicular to a plane defined by the two slots, the motherboard providing a plurality of connectors;
   a first expansion card directly inserted into one of the connectors of the motherboard, the first expansion card having a first slot cover provided at a side thereof for covering one of the slots;
   a second expansion card having a second slot cover provided at a side thereof for covering the other one of the slots;
   a riser card directly inserted into another one of the connectors of the motherboard and secured to the enclosure, the riser card being configured for receiving the second expansion card to provide electrical connection between the second expansion card and the motherboard.

18. The electronic assembly as described in claim 17, wherein two perpendicular sides of the riser card are contactingly secured to the enclosure.

19. The electronic assembly as described in claim 18, wherein the riser card has a U-shaped sectional configuration, and comprises a top panel, a side panel and a bottom panel cooperatively defining a space for receiving the second expansion card.

20. The electronic assembly as described in claim 17, wherein the enclosure comprises a plate defining an access communicating the interior and the exterior of the enclosure, a retaining bracket being secured to the enclosure at the access, the slots being defined at the retaining bracket and the riser card being secured to the retaining bracket.

* * * * *

UNITED STATES PATENT AND TRADEMARK OFFICE
CERTIFICATE OF CORRECTION

PATENT NO. : 7,626,830 B2 Page 1 of 1
APPLICATION NO. : 11/309925
DATED : December 1, 2009
INVENTOR(S) : Fan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this

Second Day of November, 2010

David J. Kappos
*Director of the United States Patent and Trademark Office*